Jan. 3, 1950  G. A. LYON  2,493,002
WHEEL COVER
Filed Aug. 27, 1945
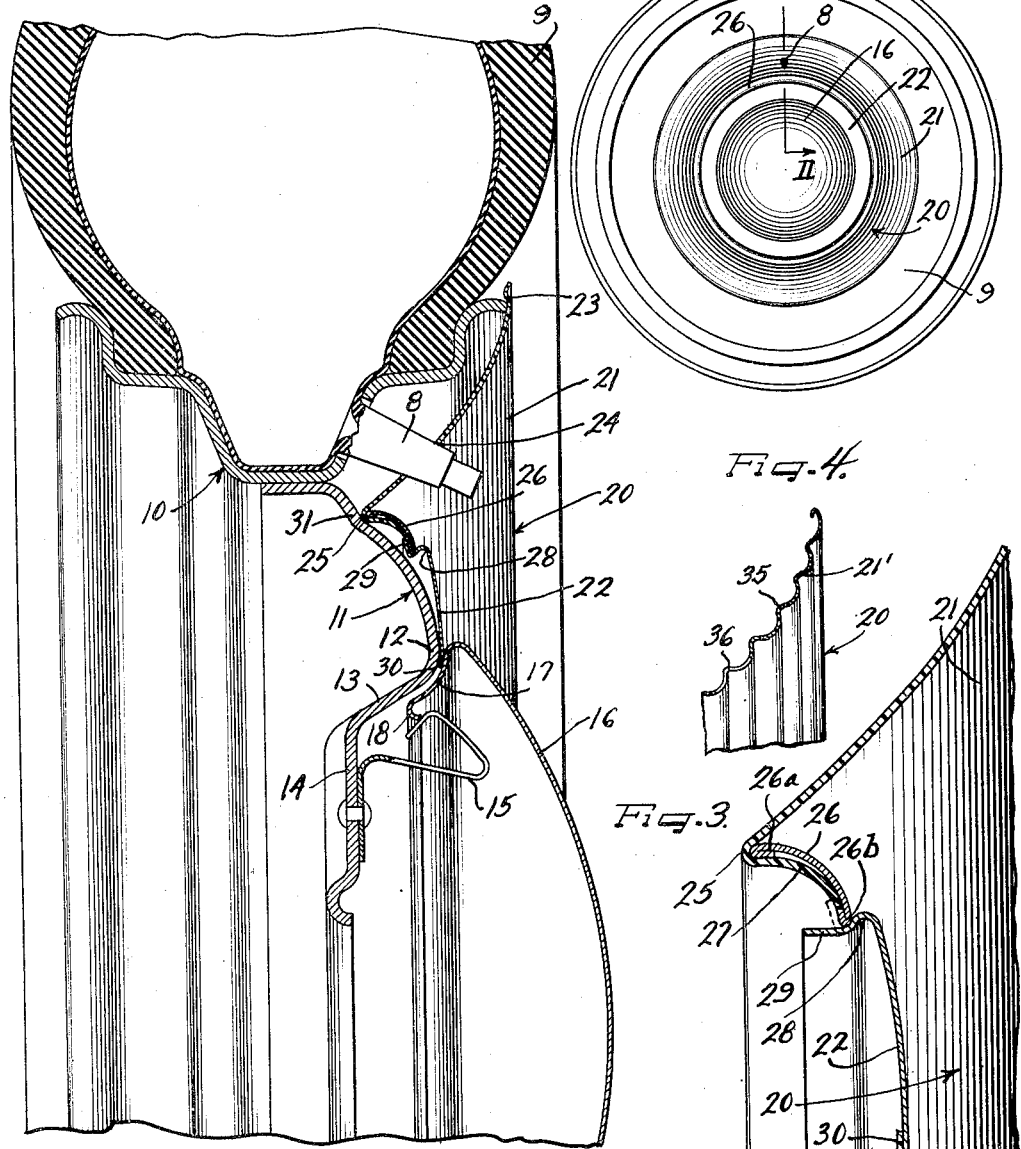
Inventor
GEORGE ALBERT LYON
by The Firm of Charles H. Hall Attys.

Patented Jan. 3, 1950

2,493,002

UNITED STATES PATENT OFFICE 2,493,002

WHEEL COVER

George Albert Lyon, Allenhurst, N. J.

Application August 27, 1945, Serial No. 612,843

8 Claims. (Cl. 301—37)

This invention relates to an ornamental cover for an automobile wheel and more particularly to a multi-part cover assembly.

An object of this invention is to provide an improved way of interconnecting a plurality of parts going to make up a wheel cover assembly.

Another object of this invention is to so interlock radially inner and outer concentric cover portions that the interlock may also be employed to hold an intermediate annular bead in place.

Still another object of this invention is to provide a combination plastic and metal cover, wherein the plastic portion of the cover is rigidified by a metal part, and wherein novel means is provided for interlocking the parts or portions in such a way that the metal part or portion can be used to clamp the entire cover assembly to an outer side of a wheel.

Another and still further object of the invention is to provide a novel multi-part plastic and metal cover, wherein the parts lend themselves to economical manufacture on a large production basis.

In accordance with the general features of this invention, there is provided in a cover structure for a wheel, including tire rim and body parts, a cover including radially inner and outer portions for cooperation with the wheel, the outer of the portions being made of resiliently pliable material, such as synthetic plastic, and the inner being made of more rigid material, such as metallic sheet, the outer margin of the inner cover portion having a shoulder against which an inner edge of the outer portion is held, and the inner portion also having axially rearwardly of the shoulder a radially outwardly turned edge lockseaming said inner edge against the shoulder.

Still another feature of the invention relates to the utilization of the aforesaid lockseam to also hold an annular bead in place on the cover at the junction of the two radially inner and outer cover portions.

Other objects and features of this invention will more fully appear from the following detail description taken in connection with the accompanying drawing, which illustrates several embodiments thereof, and in which Figure 1 is a side view of a wheel showing one form of my novel cover assembly applied thereto;

Figure 2 is an enlarged fragmentary cross sectional view taken on substantially the line II—II of Figure 1 looking in the direction indicated by the arrows;

Figure 3 is an enlarged fragmentary cross-sectional view through a portion of a combination plastic and metal cover and showing how a rear edge of the metal portion may be turned radially outwardly to interlock the plastic and metal portions of the cover together; and Figure 4 is a fragmentary sectional view showing a modified form of plastic part for the cover assembly.

As shown on the drawing:

The reference character 9 designates generally a conventional pneumatic automobile tire and inner tube, mounted in the usual way upon a drop center multi-flanged tire rim 10. The tire and tube 9 are provided with the usual valve stem 8 projecting through one of the side flanges of the rim part 10.

The rim part 10, as is customary in the art, is carried by a dished sheet metal body part 11, having an axially rearwardly inclined central portion 13, terminating in a radially extending bolt-on flange 14. This bolt-on flange, as is well known in the art, is adapted to be fastened in a detachable manner, by means of bolts or cap screws (not shown) to a part on an axle or the like. In addition the bolt-on flange 14 carries a plurality of circumferentially spaced hub cap retaining spring clips 15, which may be of any suitable number, such for example, as three to five. These clips, as is now well known in the art, may be of the so-called "inverted" type and have their free extremities so arranged as to clampingly retain in a detachable manner a hub cap 16 on the body part of the wheel.

The clips 15, as has been disclosed in numerous patents previously issued in this art, permit of a so-called "easy on" "hard off" action in the application of or removal of the cap.

The hub cap 16 may be made of metallic stamping and includes a rearwardly underturned annular skirt 17 terminating in a turned edge 18 adapted to be cammed over the free extremities of the spring clips 15 into retained engagement thereby.

My invention is particularly concerned with the provision of a novel annular cover for use with the aforesaid wheel assembly and more particularly for covering exposed portions of the rim and body parts between the outer edge of the rim part and an outer margin of the hub cap 16. I have designated one form of cover embodying this invention by the reference character 20. This cover is made up of two main portions, 21 and 22, which comprise radially inner and outer portions and are connected together in concentric relationship.

The radially outer portion 21 comprises an annulus made from a resiliently pliable material, such as synthetic plastic. The material that I use is of a type that permits of resilient deflection without permanent deformation of the same. I have attained excellent results by making the same from synthetic plastics, such as ethyl cellulose, cellulose acetate or a vinyl resin.

The radially inner cover portion 22 likewise comprises an annulus, but is made of a much more rigid material than that of the portion 21. I have attained excellent results by making this portion of a more rigid material, such for example, as sheet steel. It may be made in any suitable manner, as by punching it from a metallic sheet, or by rolling it from strip stock.

The outer plastic portion 21 has a slightly turned outer edge 23, which overhangs an outer edge of the rim part 10 in close proximity to the tire. This portion 21 may be provided with an aperture 24 so located that the free extremity of the valve stem 8 can project through the same in order to enable access to the valve stem without necessitating removal of the cover from the wheel.

The cover portion 21 extends generally radially and axially rearwardly from the outer edge 23 to an innerturned edge 25 positioned directly over the body part 11 in a slight indentation 31 therein. I purposely make the portion 21 of a slightly bowed or convex-concave cross sectional contour so that, in use, it will appear to constitute a radially inner continuation of the outer side wall of the tire. In fact, by giving the outer surface of this portion 21 a white finish, or by making the portion 21 of white plastic, it is possible to cause this portion to appear to be a white side wall part of the tire. This enables the tire to have a massive appearance and one wherein the tire appears to extend clear down to the body part 11.

The turned portion 25 constitutes a junction point between the main body of the cover portion 21 and a radially inner divergent portion 27. This divergent portion or margin 27 is of a curved or bowed cross sectional contour and is so shaped as to permit of the nesting thereover of an ornamental bead 26. The annular bead 26 may be made of any suitable metallic material, and excellent results may be attained by making it of stainless steel strip or the like. The radially outer and inner edges 26a and 26b of this bead 25 may be turned rearwardly upon the main body of the ring, as is clearly shown in Fig. 3. The outer turned edge 26a of this bead is adapted to nest in the turned portion 25 of the cover portion 21. The innerturned edge 26b is adapted to nest behind a radially outwardly extending annular shoulder 28 on the central or radially inner metallic cover portion 22.

The central or inner metallic cover portion 22 has an axially rearwardly located edge portion 29 which is adapted to be turned from the full-line position shown in Fig. 3, to the dotted line position so as to lockseam the two cover portions together and to also secure the bead 26 in proper position at the junction of the two portions 21 and 22. Any suitable press equipment may be employed for turning the edge 29, as described above. In addition, the radially inner edge of the metallic cover portion 22 may be turned, as indicated at 30, to provide a reinforced area for clamping engagement by the hub cap 16.

In the application of the cover assembly to the wheel, the aperture 24 is first aligned with the valve stem 8 and then the cover 20 is pressed axially home into contact with the outer edge of the rim part 10 and also with the body part 11 at 31. Thereafter the hub cap 16 is pressed axially home into retained cooperation with the spring clips 15 in which position the hub cap 16 clampingly engages the inner margin of the metal cover portion 22 to retain the same on the wheel.

The hub cap 16 may be removed by any suitable pry-off means, such, for example, by a pry-off tool. It is common to use a screw driver for this purpose. Upon removal of the hub cap 16, the wheel cover 20 may be easily lifted from the wheel.

It will also be perceived that when the cover 20 is clamped to the wheel, access may be made to the rear side of the portion 21 by flexing the plastic portion 21 away from the rim part 10. This may be accomplished by manually gripping the outer edge 23 of the cover portion and slightly deflecting the same relative to the wheel. Needless to say, the character of the material in the portion 21 is such that this manual deflection of the portion will not result in any permanent deformation of the same. On the contrary upon release of the deflected portion, the portion 21 will return or spring back to its original contour.

From the foregoing it is clear that I have provided a very simple structure for interconnecting plastic and metal portions of a wheel cover, and which is of such arrangement that the plastic portion 21 need not be subjected to any strains or stresses, such, for example, as clamping pressures or pry-off forces. In reality, the mere clamping of the metal portion 22 to the body part of the wheel results in the plastic portion 21 being held in tensioned engagement with the wheel part at the outer edge 23 and at the indentation 31.

It is also clear that the multi part cover assembly of my invention described above permits of highly decorative contrasting color effects. For illustration, the portion 21 may comprise a white portion, the bead 26 may be a lustrous bead, and the central portion 22 may be given a color finish such as that used on the body of the vehicle. In addition, if it is so desired, the hub cap 16 may be given a lustrous external finish. This results in a series of concentric differently finished portions or parts in the entire cover assembly, including the cover 20 and the hub cap 16.

In Fig. 4 I have illustrated a slight modification of the invention wherein the radially outer portion of the cover 20' may be provided with a plurality of concentric corrugations. I have designated this outer cover portion by the reference character 21' and have designated the corrugation by the reference character 35. The bottom of one of these corrugations may be provided with an aperture 36 through which the valve stem 8 can extend. Otherwise, this form of cover 20' is identical to the cover 20 previously described.

I claim as my invention:

1. As an article of manufacture, a cover for a wheel including concentric radially inner and outer portions, the outer of which being made of resiliently pliable material, which is deflectable without permanent deformation and the inner being made of more rigid material, such as metallic sheet, the outer margin of said inner portion having a shoulder against which an inner edge of said outer portion is held and said inner portion also having axially rearwardly of said shoulder a radially outwardly turned edge lockseaming said edge against said shoulder, the inner margin of said outer portion adjacent said inner edge being bowed axially outwardly in a generally divergent direction from that of the main body of the outer portion and an annular bead seated on said bowed margin and held in place thereover by said lockseam, said annular bead being of a convex-concave cross-sectional contour and having a radially outer edge nested in the junction of said inner margin with the main body of the outer cover portion and having a radially inner edge held in place between said shoulder and said turned edge of the inner cover portion.

2. As an article of manufacture, a cover for a wheel including concentric radially inner and outer portions, the outer of which being made of resiliently pliable material, which is deflectable without permanent deformation and the inner being made of more rigid material, such as metallic sheet, the outer margin of said inner portion having a shoulder against which an inner edge of said outer portion is held and said inner portion also having axially rearwardly of said shoulder a radially outwardly turned edge lockseaming said edge against said shoulder, the inner margin of said outer portion adjacent said inner edge being bowed axially outwardly in a generally divergent direction from that of the main body of the outer portion and an annular bead seated on said bowed margin and held in place thereover by said lockseam, said annular bead being of a convex-concave cross-sectional contour and having a radially outer edge nested in the junction of said inner margin with the main body of the outer cover portion and having a radially inner edge held in place between said shoulder and said turned edge of the inner cover portion, said inner cover portion having a radially inner turned edge for clamping cooperation with a hub cap.

3. In combination in a wheel cover of the character described, an outer annular cover member having an inner marginal flange, an inner circular cover member, an annular attachment and reinforcing strip engaging said flange, and means on said inner cover member clamping said flange to said strip and thereby securing the cover member and strip into a unitary structure, said flange and said strip being of outwardly bowed concavo-convex cross-section and internested, with the internested inner edge portions of the strip and the flange in said clamped relation to the inner cover member and with the outer edge portion of the strip located at the juncture of the flange with the outer cover member.

4. A cover structure comprising an outer annular plastic member of such width and configuration as to conceal the tire rim of a wheel which also includes a body member and so disposed as to engage the body member radially inwardly from the tire rim, the inner margin of said outer cover member having an axially outwardly and radially inwardly divergent flange providing an axially outwardly opening reentrant groove between the body of the outer cover member and the flange, a reenforcement and supporting strip of annular form and substantially complementary in width to said flange, engaging the outer face of the flange and having an underturned rounded, reenforced outer edge nested within said groove and an underturned reenforced inner edge adjacent to the inner edge of said flange, and an inner cover member formed with a radially outwardly opening annular groove having the reenforced inner edge of said strip and said flange therein, said inner cover member having a clamping flange securing said outer cover member flange to said strip and clamping said strip in said outwardly opening annular groove whereby to secure the cover members and strip into a unitary structure.

5. A wheel structure including a tire rim and a wheel body, and a cover for said wheel including an outer annular cover member shaped in general simulation of a continuation of a tire side wall and disposed to conceal the tire rim, the inner margin of said outer cover member having a generally radially and axially outwardly extending annular flange divergently related to the body of said outer cover member and forming a generally axially inwardly extending shoulder resting against the wheel body, an annular retaining and reinforcing strip of substantially complementary width to said flange, engaging the outer face of the flange and having its outer edge bearing within the juncture between the flange and body of the outer cover member and holding said shoulder against the wheel body, and an inner cover member clamping the inner margin of said flange and said strip together and to itself whereby to secure the cover members and the strip into a unitary assembly, said inner cover member being attached to said wheel body.

6. As an article of manufacture, a cover for a wheel including concentric radially inner and outer portions formed from sheet material, the outer margin of said inner portion having a rearwardly extending shoulder formation adjacent to which an inner edge of said outer portion is held, the inner margin of said outer portion being in the form of a flange extending in a generally axially outwardly divergent direction from the main body of the outer portion toward said shoulder formation, and an annular reinforcing and retaining bead seated on said divergent inner marginal flange and retained in place on said shoulder formation.

7. In combination in a wheel cover of the character described, a radially outer annular cover member having an inner marginal flange divergently related thereto and defining an outwardly opening groove formation at the junction of the flange and body of said cover member, a radially inner circular cover member, and an annular attachment and reinforcing strip extending from said inner cover member engaging the outer side of said flange to said groove in concealing relation to the flange.

8. In a cover assembly for application to the outer side of a vehicle wheel having a tire rim and a wheel body of a formation to afford a relatively wide and deep annular V-groove at the outer side of the wheel, the cover assembly comprising a trim ring dimensioned substantially to conceal the tire rim, and an inner circular cover member having a general cross sectional formation to substantially follow the wheel body contour in a radially outward and axially inward direction and adapted to conceal a substantial portion of the wheel body, said trim ring having the body portion thereof formed to extend in a generally radially and axially inward direction from the outer margin thereof and having an inner marginal flange formation extending generally radially inwardly and axially outwardly in divergent relation to the trim ring body, said marginal flange formation being attached in unitary assembly with the inner cover member and cooperating therewith to continue the general radially outward and axially inward cross sectional contour of the inner cover member to the juncture convergence with the trim ring body and thereby providing in the cover ensemble a generally V-groove formation simulative of the outer side formation of the wheel but of more attractive appearance.

GEORGE ALBERT LYON.

REFERENCES CITED

The following references are of record in the file of this patent:

UNITED STATES PATENTS

| Number | Name | Date |
|---|---|---|
| 1,234,387 | Pugh | July 24, 1917 |
| 1,807,697 | Lyon | June 2, 1931 |
| 1,971,161 | Lyon | Aug. 21, 1934 |
| 2,010,099 | Lyon | Aug. 6, 1935 |
| 2,026,597 | Short | Jan. 7, 1936 |
| 2,101,318 | Lyon | Dec. 7, 1937 |
| 2,279,704 | Davenport | Apr. 14, 1942 |
| 2,326,788 | Lyon | Aug. 17, 1943 |